No. 817,210. PATENTED APR. 10, 1906.
H. A. WILLIAMS.
MAGNETIC FRICTION CLUTCH.
APPLICATION FILED MAY 26, 1905.
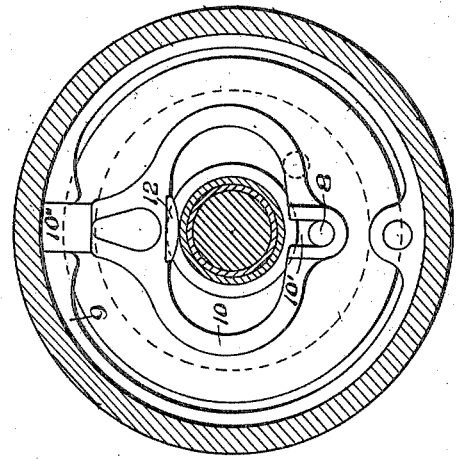
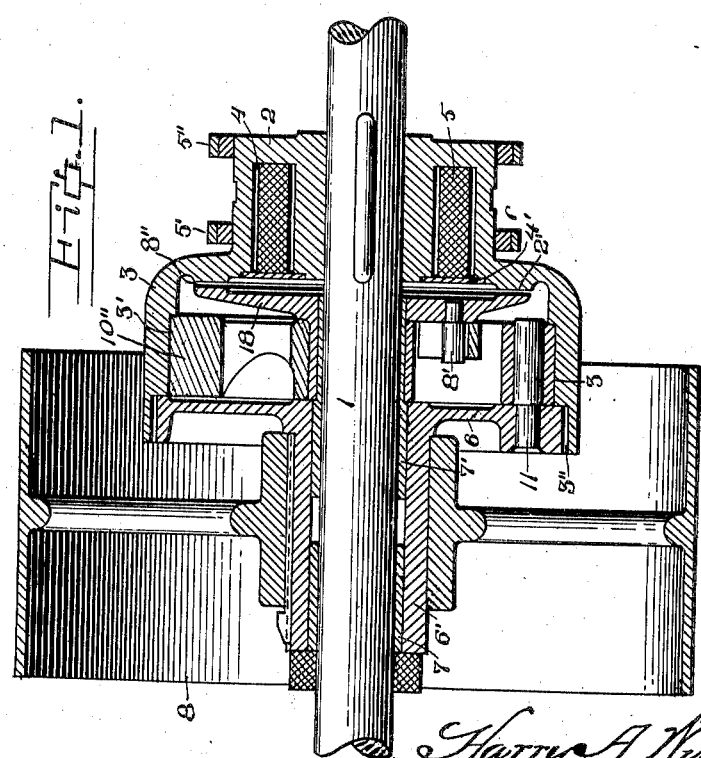

UNITED STATES PATENT OFFICE.

HARRY A. WILLIAMS, OF AKRON, OHIO, ASSIGNOR TO THE WILLIAMS ELECTRIC MACHINE COMPANY, OF AKRON, OHIO.

MAGNETIC FRICTION-CLUTCH.

No. 817,210.	Specification of Letters Patent.	Patented April 10, 1906.

Application filed May 26, 1905. Serial No. 262,371.

*To all whom it may concern:*

Be it known that I, HARRY A. WILLIAMS, a citizen of the United States, residing at Akron, in the county of Summit and State of Ohio, have invented certain new and useful Improvements in Magnetic Friction-Clutches, of which the following is a specification.

This invention relates to improvements in magnetic friction-clutches, and relates particularly to a mechanical clutch mechanism the friction members of which are operated electrically.

The object of the invention is the provision of a clutch and operating mechanism therefor located on a shaft, the clutch consisting of but comparatively few elements, being simple in construction and cheap or inexpensive in first cost.

A further object is the provision of a compact, durable, and efficient mechanism applied directly to a shaft for the purposes of such a device, and the compactness of the mechanism renders the device particularly available for use in a small or limited space.

As illustrated, the driving member of the clutch is brought into operative relation with the driven member thereof by electrical connections; but it will be understood that I may also use other than electric means for rendering the clutch operative.

The invention consists, essentially, of a driving member of a clutch rigidly located on a shaft, a driven member which may consist of several elements carried loosely on said shaft, an intermediate expansible clutch-operating member, and means—in this instance a magnetic coil—for operatively connecting the three mentioned members.

The invention further consists in certain novel features of invention, constructions, and combinations of parts, as hereinafter pointed out.

I have illustrated in the accompanying drawings one example of the physical embodiment of my invention; but it will be understood that various changes, alterations, and modifications may be introduced at will within the limits of my claims without departing from the spirit of the invention.

Referring to the drawings, Figure 1 is a vertical central sectional view through the clutch, showing all parts of the mechanism, except the shaft, in section. Fig. 2 is a cross-section on the lines x x, Fig. 1.

The shaft 1 may be a line-shafting or a driving-shaft and may be used in connection with machinery or vehicles wherever applicable. The shaft 1 carries rigidly therewith the driving member of the clutch, as a disk 2, which is keyed or otherwise fastened to said shaft. An enlarged cup-shaped portion or drum 3 is formed integral with the driving-disk 2 and incloses the intermediate operative connections of the clutch mechanism. As illustrated, this cup or drum is integral with the disk 2; but it will be understood that said portions may be made in pieces and rigidly connected together, if desired. An annular recess 4 is cut out interiorly of the disk 2, and this recess or cavity forms a seat for the coil 5. The magnetic coil 5 is suitably installed in said recess or cavity and a ring-shaped plate 4' is inserted and fastened in a suitable groove or recess in the face of the disk 2, thus inclosing the coil, rendering the recess air-tight, and protecting the coil from moisture or oil.

The terminal wires of coil 5 are connected to the commutator-rings 5' and 5", to which rings the electric current is transmitted by brushes or rollers in ordinary manner.

The driving-disk 2 is provided at its inner face with an annular surface or smoothed face ring 2', and the drum or cup portion 3 of the disk is also provided with a finished interior surface, as 3', these two surfaces being adapted as friction-surfaces in the operation of the clutch, as will be described.

A loose disk 6 is mounted on the shaft adjacent the driving or rigid disk 2 and is provided with an elongated hub 6', between which hub and the shaft may be introduced bushings 7 7'. A driven pulley 8 is keyed or otherwise secured to the driven disk 6 and rotates therewith. As will be observed in Fig. 1, the driven disk projects within the drum or cup-shaped portion 3 of the driving-disk 2, a recess 3' being provided for that purpose, and the parts thus form a protection and covering for the operating parts of the clutch mechanism. The bushing 7' projects within the drum or cup 3 and carries thereon a friction-disk 18, which is free to turn on the bushing or shaft 1. A pin 8' is securely fastened in said plate and projects therefrom, and an annular ring or surface 8" is formed on the face of said disk complementary to the friction-surface 3' of the driving-disk 2.

An elastic or expansible friction-ring 9, preferably a broken ring, is located in the drum 3 and is adapted to contact with the surface 3' of said cup or drum. This friction-ring is rendered operative by the connection of said ring and the friction-disk 18. These two elements are connected operatively by an expansion-lever 10, which serves to expand the elastic ring 9, and the expansible ring 9 is fastened to the driven disk 6 by a pin or bolt 11.

Lever 10 is provided at one end with a slot 10', into which projects the pin 8' of the friction-disk, and at its other end an enlargement or head 10" is formed, which when the parts are assembled is located between the ends of the broken expansible ring 9. A projecting lug 12 is formed on the lever and is adapted to rest on the hub of the magnetic friction disk or plate 8.

From the foregoing description it will be understood that the driving member of the clutch carrying the magnetic coil is rigidly secured to the shaft and revolves therewith. The driven member, consisting of the driven disk, driven pulley, expansible ring, expansion-lever, and friction-plate, are loosely mounted on the shaft and do not revolve therewith unless they are in operative connection with the driving member of the clutch.

Assuming the driven member of the clutch to be at rest and the driving member rotating, when it is desired to operate the clutch mechanism the proper electric current is introduced, the coil is energized, and by magnetism draws the friction-disk into contact with the driving-disk at the surfaces 3' and 8". The friction between these two surfaces thus generated causes the friction-plate to revolve with the driving-disk. The pin 8' of the friction-plate, located in slot 10' of lever 10, swings said lever in the direction of the rotation of the driving-disk—as, for instance, to the position of the pin shown in dotted lines, Fig. 2. The movement of the lever and its head between the ends of the expansible ring expands said ring against the friction-surface 3' of the drum, and as said expansible ring is rigidly fastened to the driven disk by pin 11 the driven disk is revolved, carrying with it the keyed pulley 8.

Having thus fully described my invention, what I claim, and desire to secure by Letters Patent, is—

1. The combination of a shaft, a driving member rigid therewith and a driven member loose thereon, an expansible member carried by the driven member, adapted to engage the driving member a magnetic coil carried by the driving member, and means operated by said coil to expand the expansible member and engage the driving and driven members.

2. The combination with a shaft of a clutch mechanism consisting of a driving member and a driven member; an expansible member on the driven member, a friction member operatively connected therewith, and electrical connections for engaging said frictional member with the driving member.

3. In a clutch mechanism, a driving-disk carrying a magnetic coil, a driven disk carrying an expansible member, a friction member operatively connected with the driven disk, and electrical connections for engaging said friction member with the driving-disk.

4. In a clutch mechanism a driving-disk carrying a magnetic coil, a driven disk carrying an expansible member, a friction member, a lever connecting said expansible member and friction member, and electrical connections for engaging said friction member with the driving-disk.

5. In a clutch mechanism, a driving-disk, a driven disk carrying an expansible member, a rotatable member adapted to be engaged by the driving-disk to rotate therewith, and means connecting said rotatable member with the expansible member to engage the latter member with the driving-disk.

6. The combination of a driving-disk, a rotatable disk adapted to be engaged by the driving member to rotate therewith, a driven disk and an expansible member carried thereby, and a lever connected with the rotatable disk adapted to expand the expansible member into operative contact with the driven disk.

7. A driving-disk having a drum portion, a rotatable disk inclosed therein and adapted to rotate therewith; a driven disk, an expansible ring carried thereby and adapted to engage the drum, and a lever connected with the rotatable disk adapted to expand the expansible ring.

8. The combination of a driving-disk carrying a magnetic coil, a driven disk, a pulley rigid therewith, an expansible ring connected with the driven disk, a lever, and electrical connections whereby said ring is expanded by said lever.

9. The combination of a driving member carrying a magnetic coil, a friction-disk adapted to engage and rotate with said member, a driven member carrying an expansible broken ring, and a lever carried by said friction-disk having a head located between the ends of the expansible broken ring.

10. The combination of a driving member carrying a magnetic coil, a friction-disk adapted to engage and rotate with said member, a driven member carrying a broken ring, a pin on the friction-disk, and a slotted lever engaging said pin at one end and having its head between the ends of the broken ring.

11. The combination of a driving member, a rotatable disk adapted to engage and rotate with said member, a driven member carrying a broken ring, a slotted lever having its head between the ends of the broken ring, and a pin on the rotatable disk engaging said slotted lever.

12. The combination with a driving member having a drum portion, a rotatable disk within said drum adapted to engage and rotate with the driving member, a broken ring within the drum and adapted to engage the interior thereof, a slotted lever having a head in said broken ring, and a pin on the rotatable disk engaging said slotted lever.

13. The combination with a driving member carrying a magnetic coil, a drum formed on said member, a friction-disk within the drum adapted to engage and rotate with the driving member, a broken ring within the drum adapted to engage the interior thereof, a slotted lever having a head in said ring, and a pin on the rotatable disk engaging said slotted lever.

14. The combination of a driving member having an annular recess therein, a coil in said recess, a plate covering the opening to said recess, a driven member, an expansible ring carried thereby, a friction-plate, and an operating-lever connecting said plate with the expansible ring.

In testimony whereof I affix my signature in presence of two witnesses.

HARRY A. WILLIAMS.

Witnesses:
WILLIAM T. VAUGHAN,
EDWIN F. VORIS.